United States Patent
Lemchen et al.

(10) Patent No.: US 6,792,091 B2
(45) Date of Patent: Sep. 14, 2004

(54) NETWORK-BASED INTERCOM SYSTEM AND METHOD FOR SIMULATING A HARDWARE BASED DEDICATED INTERCOM SYSTEM

(76) Inventors: Marc S. Lemchen, 553 Park Ave., New York, NY (US) 10021; Rovi Cohen, 820 Ocean Pkwy., Apt. 702, Brooklyn, NY (US) 11230

( * ) Notice: Subject to any disclaimer, the term of this patent is extended or adjusted under 35 U.S.C. 154(b) by 0 days.

(21) Appl. No.: 10/121,144

(22) Filed: Apr. 10, 2002

(65) Prior Publication Data

US 2003/0161455 A1 Aug. 28, 2003

Related U.S. Application Data

(60) Provisional application No. 60/358,845, filed on Feb. 22, 2002.

(51) Int. Cl.$^7$ ................................................. H04M 1/00
(52) U.S. Cl. ...................................................... 379/159
(58) Field of Search ........................... 379/72, 76, 88.11, 379/88.12, 88.13, 88.16, 88.19, 88.23, 156, 160, 164, 167.01, 373.01, 373.02, 373.03, 373.04, 374.02, 159; 709/204, 220, 227, 231, 232

(56) References Cited

U.S. PATENT DOCUMENTS

| | | | | |
|---|---|---|---|---|
| 4,953,159 A | * | 8/1990 | Hayden et al. ............... 370/62 |
| 5,014,267 A | * | 5/1991 | Tompkins et al. ........... 370/259 |
| 5,606,496 A | * | 2/1997 | D'Agostino ................ 395/235 |
| 5,742,670 A | * | 4/1998 | Bennett ....................... 379/142 |
| 5,978,835 A | * | 11/1999 | Ludwig et al. ............. 709/204 |
| 6,212,547 B1 | * | 4/2001 | Ludwig et al. ............. 709/204 |
| 6,237,025 B1 | * | 5/2001 | Ludwig et al. ............. 709/204 |
| 6,252,952 B1 | * | 6/2001 | Kung et al. .................. 379/114 |
| 6,292,767 B1 | * | 9/2001 | Jackson et al. ................ 704/1 |
| 6,343,314 B1 | * | 1/2002 | Ludwig et al. ............. 709/204 |
| 6,426,769 B1 | * | 7/2002 | Ludwig et al. ........... 348/14.08 |
| 6,437,818 B1 | * | 8/2002 | Ludwig et al. ........... 348/14.09 |
| 6,518,983 B1 | * | 2/2003 | Grohmann et al. ......... 345/781 |
| 6,583,806 B2 | * | 6/2003 | Ludwig et al. ........... 348/14.08 |
| 6,594,688 B2 | * | 7/2003 | Ludwig et al. ............. 709/204 |
| 6,691,111 B2 | * | 2/2004 | Lazaridis et al. ............... 707/6 |
| 2003/0161455 A1 | * | 8/2003 | Lemchen et al. ........... 379/159 |
| 2003/0190026 A1 | * | 10/2003 | Lemchen et al. ........... 379/159 |

OTHER PUBLICATIONS

"Nettopia Timbuktu Pro" Software, www.netopia.com, Tech Nology Buyer's Guide Supplement, p196, p.01 Summer 1998.*

Kokubu Naomi, Memo Mail Pop–Up Control System, Sep. 17, 1997, JP 97270599, Abstract.*

Benyamin et al., "Silent Alert System", WO 200031952 A1 (WO 0031952).*

* cited by examiner

*Primary Examiner*—Binh K. Tieu
(74) *Attorney, Agent, or Firm*—Daniel L. Dawes; Myers Dawes Andras & Sherman LLP

(57) ABSTRACT

A network-based intercom system and method comprises software and the necessary portions of a computer network on which it is implemented. The software includes a dispatcher portion to be installed on any of the computers of the network, and an intercom module portion to be installed on each of the participating computers in the system. The system has the advantage that it can be installed on non-dedicated computers, thus avoiding costly and inconvenient wiring and hardware installation. The system provides automatic message receipt without unnecessarily interrupting a recipient. This is achieved by signaling that a message has been sent by an assigned audible tone that is unique to the addressee. Thus, the recipient becomes aware that he or she has automatically received a message. The message is displayed in a banner on the addressee's computer monitor for selective viewing based on an order of priority.

54 Claims, 14 Drawing Sheets

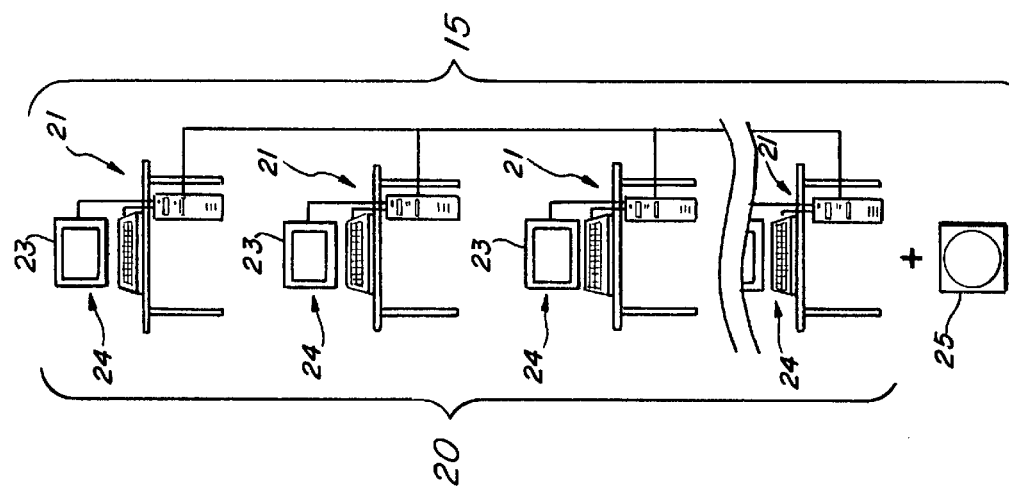
FIG. 1A
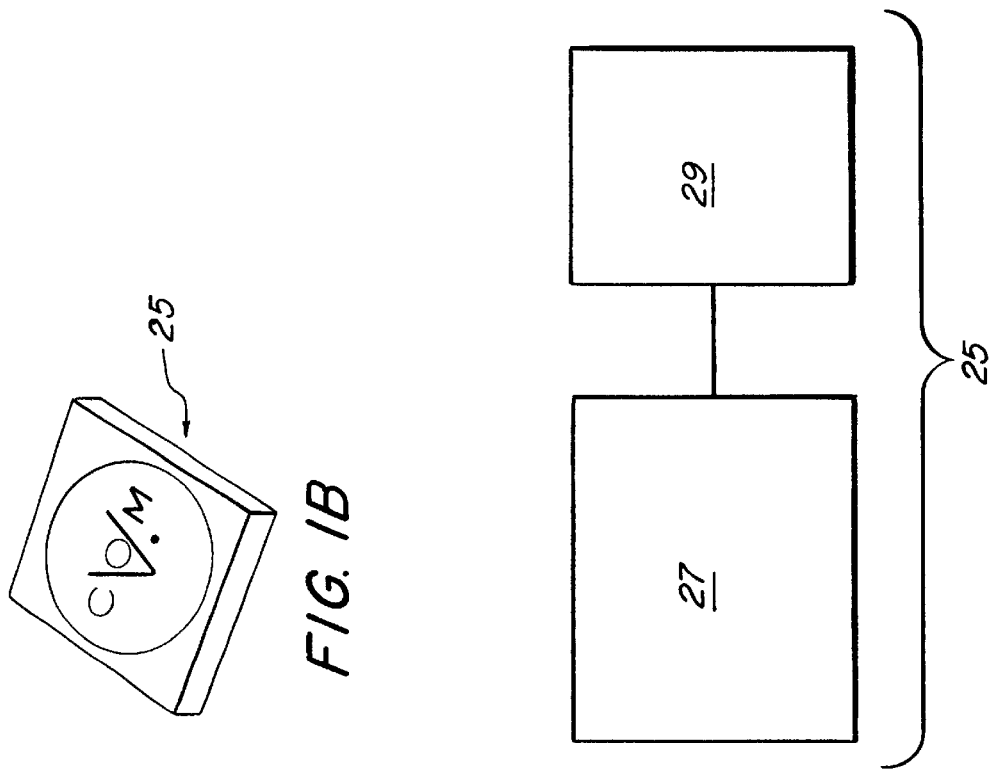
FIG. 1B
FIG. 2

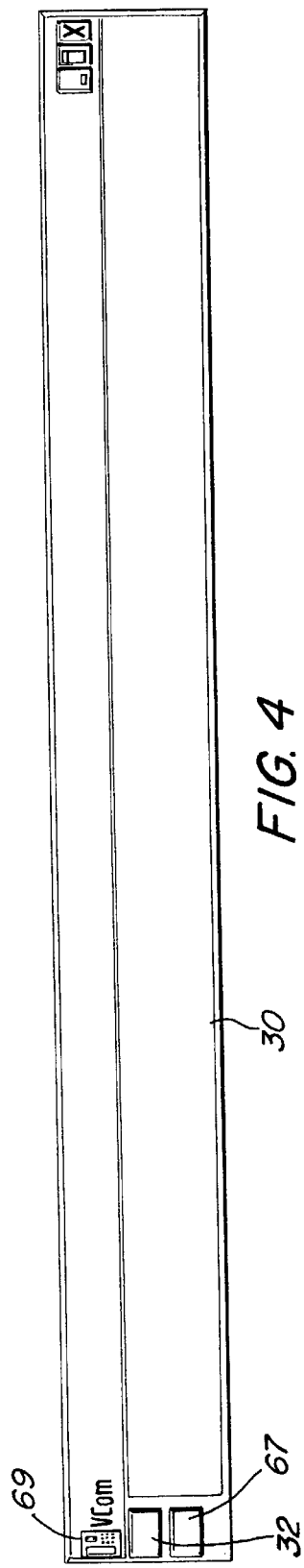
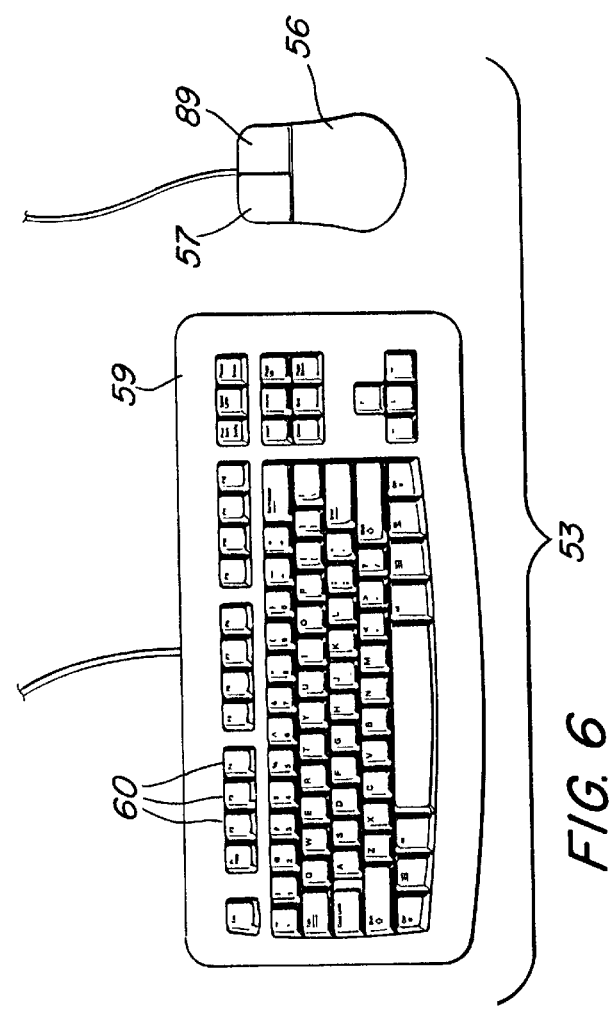

NETWORK-BASED INTERCOM SYSTEM AND METHOD FOR SIMULATING A HARDWARE BASED DEDICATED INTERCOM SYSTEM

BACKGROUND OF THE INVENTION

This application is a continuation of provisional application serial No. 60/358,845, filed Feb. 22, 2002.

FIELD OF THE INVENTION

The instant invention pertains to the art of software based business methods in general. However, the system of the instant invention is for interpersonal communications between a plurality of people in separate locations at which their voices will not conveniently carry, such that the people may properly hear each other's verbal expressions. Hence, an aid to transmitting messages is needed and has been filled by conventional intercoms. Thus, the invention more particularly pertains to the art of intercoms. In fact, the invention is a software based intercom having many of the advantages of a conventional intercom and further including additional, substantial advantages.

DESCRIPTION OF THE PRIOR ART

The prior art is devoid of network-based intercoms. The conventional intercoms that are based on hardware and wiring and are often installed in a building. Such conventional intercoms are inadequate in many ways and are expensive. The prior art also includes wireless intercoms that are also inadequate in many of the same ways as the hardware and wire type. In particular, prior art voice intercoms do not permit the recipient of the message to simply choose not to respond to a message without inconveniencing a sender. There are intercoms or messaging devices that illuminate a certain combination of lights as a code for a specific message. These light combination intercoms are inconvenient because they require the recipient to know the meaning of the combination of lights. Furthermore, the recipient may not know that a message is being sent unless he or she is looking at the lights. Additional drawbacks to the lighted system of an intercom is that the number of users and the number of messages are limited by the number of lights and the maximum number of combinations of lights in the system. Adding additional users is difficult because of hardware requirements. In order to expand an existing lighted or hard wired intercom system to include new message or additional users via additional lights, or to include additional locations can be difficult and expensive if not impossible.

The lighted version described above meets the need of keeping the communication somewhat confidential so that it does not obviously distract the recipient from something requiring his or her attention such as a procedure on a patient. However, under circumstances in which the recipient changes position in the office to a location at which the lights cannot be seen, the voice intercom system is required.

The voice intercom system has the drawback of broadcasting messages that preferably should be kept confidential. Alternatives for conveying information to the recipient include sending a third party to locate the recipient or paging them over a speaker system, neither of which is considered to be better than using the prior art intercoms.

As described above, visual and voice communication systems have been provided to display information and messages without any intervention by the recipient. This capability is important, for example, when the recipient is involved in other procedures and is not able to use his or her hands or voice to take the message. Alternatively, the recipient may simply wish to not be distracted at that moment.

Conventional intercom systems operate over telephone networks or dedicated hard-wired or wireless intercom systems. While these systems allow communication, they are not easily continuously modifiable to adjust to changes in the staff, the facility, or the messaging requirements. The conventional systems usually allow communication by a system of colored lights as referred to above. These colored lights are not suitable for colorblind users. These conventional systems may also have the capability of communicating digitally by a series of number codes or by text messages. These messages may be displayed in some prioritized order, but there is no choice of method of display such as static, scrolling, or flashing text.

The conventional intercoms add to the clutter in an office since they require a desk or wall mounted panel. The mounted panel may be selected from a variety of sizes and appearances available, but there is no assurance that they will fit of match the desk or wall to which they are mounted. Furthermore, mounting of the panels may require running power to the mounting location to supply power to the panel. Even most of the wireless types of intercoms require electrical wiring either for data transmission or for a power source. Hence the need for adding hardware or running wire is not easily overcome with prior art devices.

Outside the realm of intercoms, is a method for communicating called instant messaging that has some similarities to the present invention. However, instant messaging was designed for so called chatting on line. As such, there are specific differences from the instant invention. For example, instant messaging requires the recipient to do something in order to retrieve a message sent by another user, and is intended for immediate responses back and forth. Instant messaging does not utilize preset messages like the instant invention. Furthermore, instant messaging does not have the intricacies of the instant invention like prioratization of messages, being capable of dual messaging for a single recipient, and all the settings that are made available with the instant invention. Another example of the deficiencies of instant messaging is that a message cannot be made large enough to see from a distance.

There is a need in the art for a software based intercom system utilizing a plurality of computers networked over a local area network or being selectively connected to the World Wide Web (Internet).

There is a need for the software based intercom system to include a software driven dispatcher which resides in any one of the computers with a set of computer readable instructions for performing various functions. These functions may be adjusted by a user interfacing directly with the dispatcher, or indirectly with the dispatcher via one of the computers by selecting user selectable settings. As such, there is a need for the software driven dispatcher to interface with an intercom module software in each of the computers of the system in order to control the many settings for each of the computers.

There is a need for a software driven intercom module residing in each computer on the system with a set of computer readable instructions for sending, receiving and filtering messages as well as for controlling other user selectable functions.

There is a need for the software driven intercom system to avoid interference with existing software that is or may be currently running on the system.

There is a need for at least one symbol or indicator to indicate which message of a list was the first message that was entered into the system in order to enable a user to differentiate among messages.

There is a need for the messages to be accompanied by a unique tone or voice for each recipient in order to distinguish one from another. In this way, the users can be assigned different respective tone sounds to signal that a message has been sent to a particular addressee, which initiates getting the addressee's attention.

There is a need for a software based intercom system to require no intervention on behalf of the recipient in order to retrieve a message. That is, there is a need for the system to receive messages automatically on respective user computers.

There is a need for the system to employ a voice activated message initiation, voice actuated preset message selection, and voice actuated selection of other user options.

There is a need for the system to be capable of identifying the sender and the location of the sender automatically for each message. This identification feature should be selectively activatable by users.

BRIEF SUMMARY OF THE INVENTION

The instant invention meets all of the above stated needs. Primarily, the instant invention is a network-based intercom system that is a software based intercom system. The system is implemented on a network comprising more than one computer networked together over a local area network (LAN) or over the Internet. A plurality of individual computers connected to one another correspond to a respective plurality of network stations for users.

The software based intercom system of the instant invention includes a software driven dispatcher which resides in any one of the computers with a set of computer readable instructions for performing various functions including: routing messages, assigning individual audible tones to users, assigning message codes, displaying messages in order of priority by time of entry or other criteria, allowing pre authoring of messages, and designating station numbers. The dispatcher also permits several additional functions in accordance with user input from any of the modules on the respective computers of the network. These additional functions are initiated by the respective users. An example of such a function is filtering individual(s) or groups of individuals. However, the actual filtering is performed by the dispatcher software based on the user selected functions from respective stations.

The software driven intercom of the instant invention has a software module that resides in each member computer of the system with a set of computer readable instructions for sending, receiving and filtering messages. The software modules also facilitate modifying the placement, size, color, display format, and the time duration and priority of a display. The display format may include user selectable options including scrolling or page changing a list of messages on a banner of a display on respective computers of the system.

The network-based intercom system of the instant invention has software that controls the displays and the running of the system program. The network-based intercom system software prevents or inhibits interference by the system with existing software which is currently running on the system.

The system of the instant invention provides symbols and/or indicators indicating which of the messages in the list of messages was the first message to be entered so that a user can see the beginning, the end, and a sequence of messages between.

Messages are accompanied by a unique tone or voice that permits an addressee to distinguish one message from another with the instant invention. To this end, users are assigned different tones or sounds to signal the addressee when a message has been sent. This unique tone or voice may be in the form of the addressee's own voice or the addressee's name, either of which can be programmed into the system.

The instant invention further advantageously requires no intervention on behalf of the recipient in order to retrieve a message. The system of the instant invention causes the messages to automatically appear in the banner on the recipient's monitor by software control. The messages scroll or are otherwise displayed. The system can be set to automatically shrink the banner and park it on the toolbar, or otherwise place it in the background, after a predetermined length of time after the message has been received. A user on any one of the member computers may program the length of time that the messages are to be displayed before being placed in the background.

While in the preferred embodiment, the system generally relies upon text input or other manual actuation for formulating and sending messages, the system may alternatively or additionally include one or more of voice activated message initiation, voice actuated message formulation, and possibly even voice activated user selection of options. Voice or command recognition technology including voice or speech recognition software may be integrated in the system to achieve a partially or fully voice actuated network-based intercom system.

The voice activated system could be activated by an assistant at a patient's chair, or anywhere in the room. In this way, a message could be created by the assistant requesting that the doctor come to a particular chair or location. Alternatively, a remote control device could be employed in combination with the system. The remote control device of the instant invention can either be carried by the user or installed at a site. For example, a remote control device may be included or integrated into a chair structure or on a cabinet.

The instant invention also includes the ability to selectively, automatically identify the sender and the source location of a message. Like many other features of the system, this can be set by user selection of this option.

As can be understood from the disclosure above, the network-based intercom system of the instant invention relates to visual communication systems, and more specifically to an internal communication system having the ability to efficiently formulate and display a message. One of the specific features of the network-based intercom is that it gets the attention of the recipient without requiring an immediate response. This is of particular interest in order to avoid necessarily distracting the recipient from other, higher-priority activities at the moment the message is received. This feature is of particular interest in the medical fields since interruption of procedures may impact negatively on the outcome of the procedure. On the other hand, this feature is also advantageous in other settings and will be especially beneficial to support personnel such as for receptionists, for example. A major advantage of the network-based intercom of the instant invention is that it accomplishes these functions and advantages without the need of any dedicated hardware besides an already existing computer network.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1A is a schematic diagram of the system of the instant invention;

FIG. 1B is a perspective view of the software package of the instant invention;

FIG. 2 is a schematic view of the two components of the software;

FIG. 4 is a plane view of the simulated intercom panel of the instant invention;

FIG. 6 is a plane top view of computer input devices;

Figure 2A:
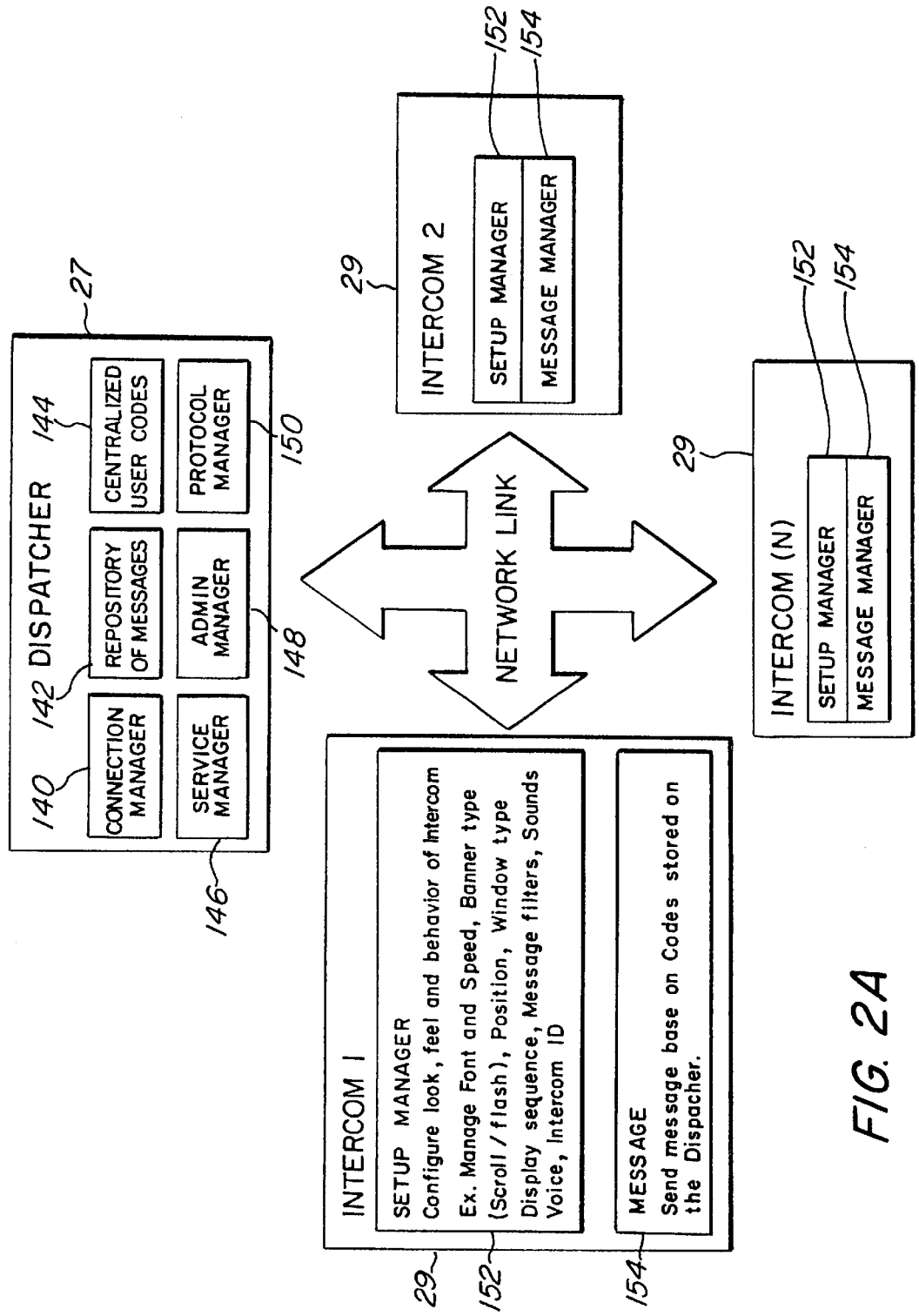
FIG. 2A is a block diagram of the components of FIG. 2 showing greater detail as to their subdivisions and functions.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

FIG. 1A is a schematic depiction of the network-based intercom system 15 of the instant invention. As shown in FIG. 1A, the system 15 is employed in and includes the necessary elements of a network 20. The Network 20 may be a local area network (LAN). The network 20, of course, has computers 21 connected together. Each computer includes a processor 22 and a monitor 23. Each computer provides a respective station 24. The network-based intercom system 15 also includes the network-based intercom system software 25.

As shown in FIG. 1B, the network-based intercom system software 25 may be packaged in a conventional CD and carried in a case for protection and marketing. The network-based intercom system software 25 has two components that interact with each other, most commonly via the network. The two components are shown in FIG. 2. The first component is a dispatcher 27 which includes dispatcher software or control software. The dispatcher may be installed on any of the computers 21 of the network. The second component of the network-based intercom system software 25 is the intercom module 29. The intercom module 29 has user interface means under software control. The intercom module 29 is to be installed on each of the computers of the network that is intended to participate in communication by way of the network-based intercom system 15.

The function and interaction of the different modules is shown in greater detail in FIG. 2a. As shown, the dispatcher 27 includes several parts performing several respective functions. The Connection Manager 140 provides a viewable console to monitor all connections in the system 15. The Repository of Messages 142 is a centralized storage of communication and messages. The Centralized User Codes 144 is a centralized storage of user defined message codes that are synchronized with all intercoms on the system. The Service Manager 146 keeps a message alive to verify an associated connection. The Administration Manager 148 handles registration messages, verification of licenses, and synchronization of data between the dispatcher 27 and the intercom 29. The codes, (which include messages, groups, and hot keys), are continually synchronized between the dispatcher 27 and the intercom 29 by the Administration Manager 148. The System Protocol Manager 150 handles adding and deleting of messages, deleting groups of messages, and changes in settings as they are applied to the banners.

Each intercom module 29 includes a Setup Manager 152 and a Message Manager 154 as shown in FIG. 2a. The particular functions of the various parts and modules of the software are determined by the program code. The language used for the program code can be any of a variety available. However, at the time of the invention, the program was written in Visual Basic. The actual code is included in the file wrapper as Appendix A, but is deleted from the application prior to any publication thereof.

Figure 3:
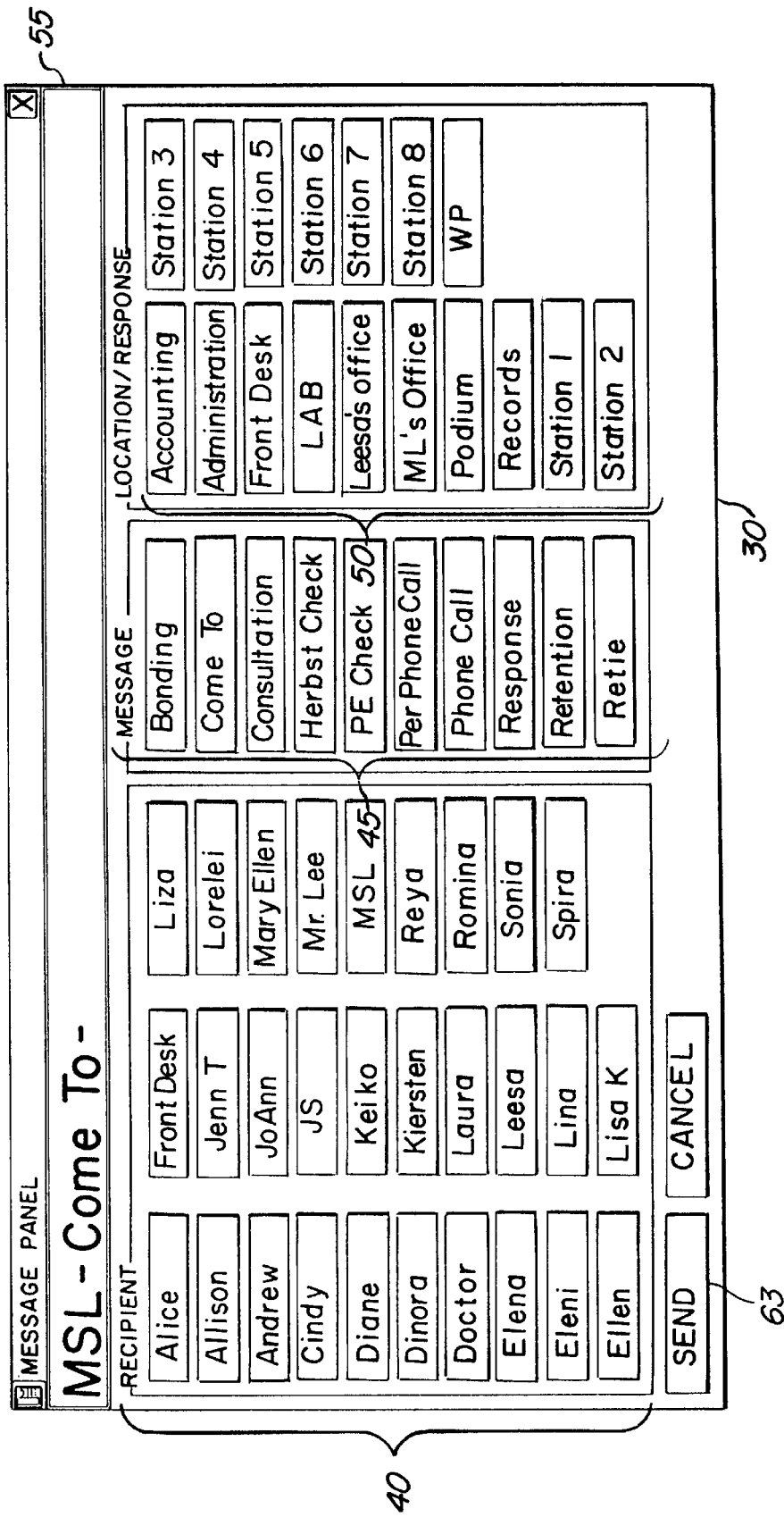
FIG. 3 is a plane view of the display banner of the instant invention.

FIG. 3 shows a banner 30 supported by the Message Manager 154 of the software 25. In the preferred embodiment, the banner 30 automatically appears on a monitor 23 when the dispatcher 27 and the intercom module 29 have both been installed. The banner 30 will also automatically appear thereafter each time the dispatcher 27 and the intercom module 29 are run. The banner automatically comes up on the top to the screen when the intercom module 29 is run. The intercom module 29 automatically resizes the window previously in use to allow the banner 30 to sit on top, and not obstruct any of part of the window that was previously in use. The intercom module can also be set to automatically resize subsequent windows that are brought up so that they do not cover the banner 30. Alternatively or additionally, the banner can be resized manually as further described below. To use the intercom system 15, a user clicks on soft button 32 at the upper left end of banner 30. Doing so brings up a simulated intercom panel 35.

FIG. 4 is a plane view of the simulated intercom panel 35. Simulated panel 35 functionally simulates a conventional intercom and is supported by the Message Manager 154 portion of the software 25. The simulated panel 35 is also a message creating panel. A message may be made up of any number of components. However, the number of components in the preferred embodiment is three as shown in FIG. 4. A first component of the message comprises an addressee, selected from a list of addressees 40. The second component comprises a preset message selected from a list of preset messages 45. The third component comprises a destination location, a phone line, or a previous message response selected from separate lists of locations, phone lines, and responses 50. The third component type will vary depending on the selection of the second component. For example, upon selection of a second component, a specific third component list corresponding to the selected second component will appear for the third component selection.

Figure 5:
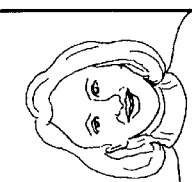
FIG. 5 is a plane view of a typical monitor screen having the display banner thereon.

The Message Manager 154 of the Intercom Module 29 of the software 25 provides for messages to be sent based on codes stored in the Dispatcher Module 27 of the software 25. Messages sent and received in the system are displayed on banner 30. An example of the banner 30 on a user's monitor screen is depicted in FIG. 5. A message may be initiated in any of a variety of ways. The input devices 53 of the preferred embodiment are shown in FIG. 6, although any of a variety of additional input devices could be used. When a message is being generated, it will show up in the message field 55 of the intercom panel 35 as shown in FIG. 4. Typically, a mouse 56 is used to input the components of the message by clicking a mouse button 57 when the curser or arrow is on the list item to be selected. Each time a component is selected, it shows up in the message field.

The message may be sent by any of a variety of ways. One way is to simply select all of the components of the message at which time the message is automatically sent. Another way is by using the keyboard 59. A message send may be accomplished by pressing a function button 60. Another option is to click on the soft send key 63 in the lower left corner of the intercom panel 35. When explicitly initiating a send by pressing a function key 60 or clicking the soft send button 63, all the components of the message need not to have been selected. Another option for sending a message is to place the curser in the message field 55 of the intercom panel 35 and to type a customized text message. It is contemplated that any of the above message creating and sending steps may be used alone or in combination for message creation and sending. Of course, all of this is facilitated by software control of the network-based intercom system software 25.

As shown in exemplary FIG. 5, typical first and second messages 64, 65 show up in banner 30. The messages 64, 65 each have three parts separated by dashes. A symbol 66 is displayed next to either a first or a last element in order to provide a frame of reference of where a list of messages begins and ends. The Setup Manager 152 of the software supports the configuration of the banner 30 and the behavior of the intercom module. The display format of the messages and other banner options may be selected by clicking on banner option soft button 67. Other banner options such as size, position, minimize, and close may be adjusted by clicking on banner icon 69.

Figure 7A:
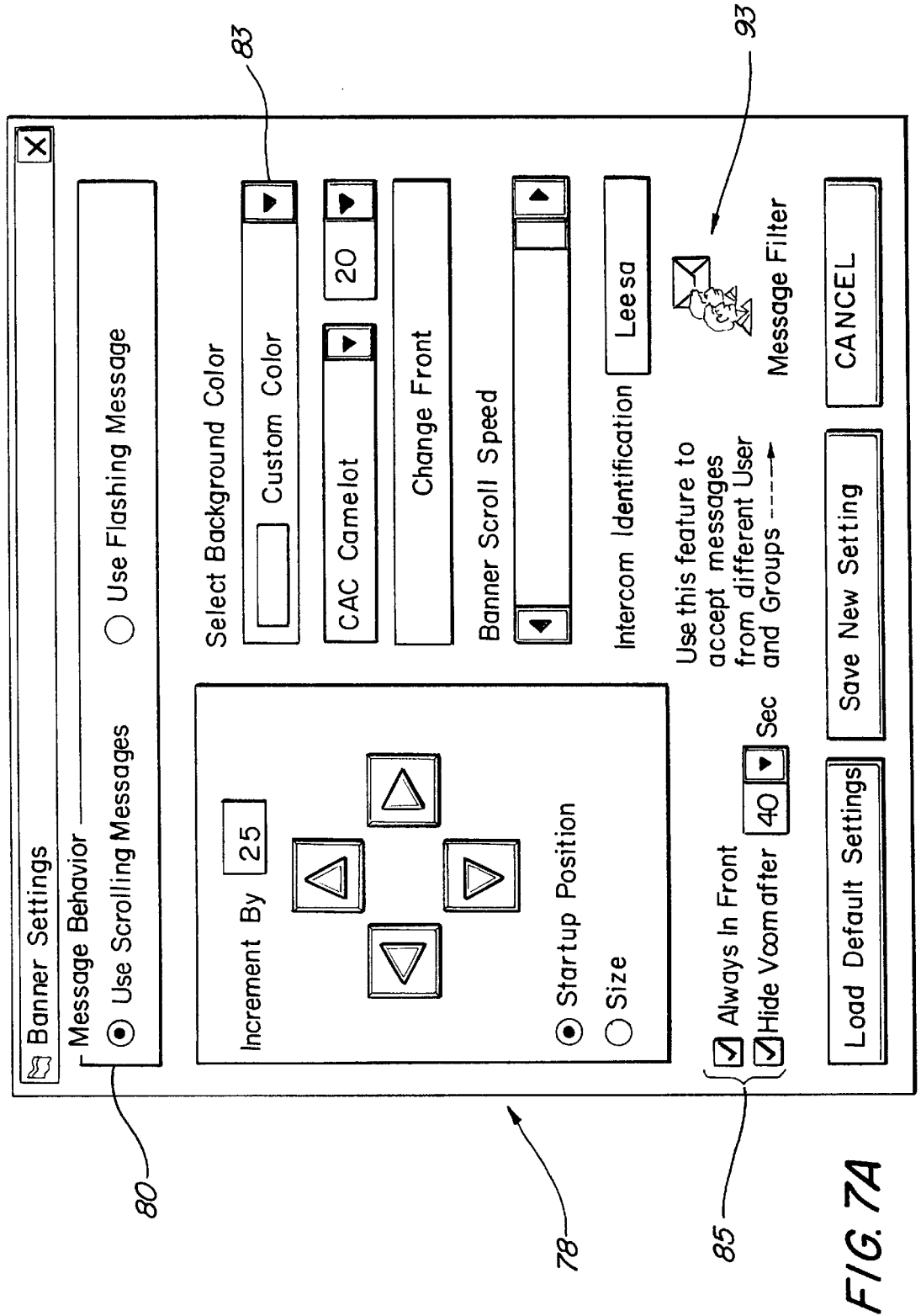
FIG. 7A is a plane view of the intercom settings screen.

Upon clicking soft button 67 of the banner 30, intercom settings screen 78 is brought up as shown in FIG. 7A. The display format of the banner may be adjusted in a variety of ways. The intercom settings screen 78 has a message display format box 80 permitting a choice of scrolling messages or flashing messages. The speed of scrolling and flashing can also be selected. Banner color select box 83 permits selection of the color of the banner. Continuous/timed display boxes 85 permit user selection of whether and how long the banner will be displayed before being hidden.

Figure 7B:
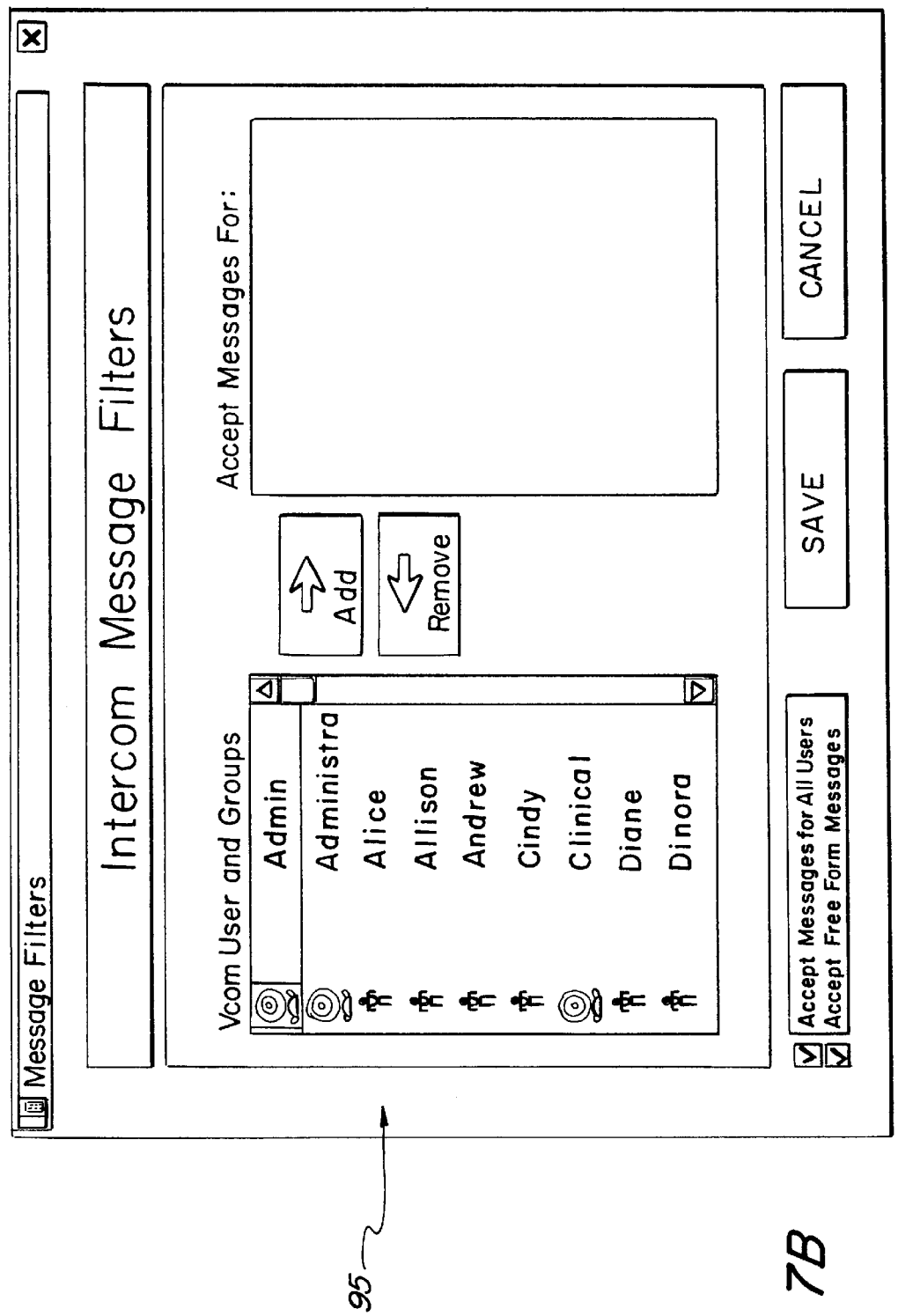
FIG. 7B is a plane view of the filter setting screen.

The intercom module 29 of the software 25 further supports selective filtering. Filter selection icon 93 permits selection of individuals, groups, or locations that can be filtered out of the list of potential senders. This option can greatly reduce the clutter of unnecessary messages when it is known that no messages from a certain group, individual, or location will be pertinent to the recipient user. Upon clicking on icon 93, a filter selection screen 95 as shown in FIG. 7B is brought up. As can be seen, individuals and groups may be selectively added to the list of those being filtered out. It is contemplated that a filter may be provided that prevents sending messages to selected individuals, groups, or locations as well.

Another convenient feature of the invention is that the user may selectively set the system to include information identifying at least one of a sender and a location from which the message has come. The means for setting this feature may include a function key, a soft button, or an icon that brings up an option selection box. The display of this information may be automatically displayed on the banner or may be selectively activated by placing a mouse pointer over the message to bring up the information in a tool tip fashion. Alternatively, a sender's location may be displayed, for example, by pressing the "ctrl" and "F" keys to bring up a preprogrammed message identifying the location of a sender.

The system 15 may also be configured to automatically include the location or intercom ID of the station from which the message is sent. In this way, a time saving feature is provided in which the location is implied by the sender and explicitly generated by software control to be that of the sender. This arrangement reduces the number of hot keys, for example, that would have to be programmed. That is, a hot key could be programmed for each procedure. Then, a message could be sent by selecting the recipient and pressing the hot key having the desired procedure. In this way, a recipient receives a full message including the location at which the sender is requesting the particular procedure, for example. This feature is termed autoloc TM signifying the automatic location assignment.

Another convenient feature for customizing a partially automatic message is by using hot keys to generate specific pre-programmed partial messages. Advantageously, when the last of a combination of keys, for example, are pressed by the sender, a dialog box or window is automatically pulled up by software control to permit completion of the message by the sender. This has the advantage of offering an intermediate level of automation to message preparation and sending. Alternative ways of pulling up the dialog box are considered to be within the scope of the invention. For example, while the last in a series of keys pressed in a hot key command will normally pull up the dialog box, an additional key may be added to any combination and in any sequence to bring up the dialog box. Messages created with this feature are termed hotmessages TM. Utilizing this feature is called hotmessaging TM.

An additional convenient feature is that of dual messaging for a single recipient. This feature is useful when a sender has a non-urgent message that needs to be sent. A list of these non-urgent messages may be printed out or viewed, and reviewed periodically by the recipient. Alternatively, the non-urgent messages may be automatically printed out at particular time of the day. This feature can be activated by the sender and is facilitated by software control. The result is that the message to be sent will be stored as a non-urgent message for later printing or retrieving. This optional feature of storing a message may be in addition to a standard transmission of the message. This secondary message type in addition to the primary type that automatically shows up on a recipient's banner provides a dual messaging feature in which selecting the option of storing provides a permanent record of the sent message that can be retrieved and printed in addition to the sent message displayed on a recipient's banner. The means for selecting this option may include a function key, a soft button, or an icon that brings up an option selection box. These setup features are supported by the Setup Manager 152 portion of the software 25. The Setup Manager 152 also controls the look, feel, and behavior of the intercom 29. Configuring the looks, behavior, window types, and setting intercom IDs is done through the Setup Manager 152 of the software 25 via the intercom settings screen 78.

Figure 8:
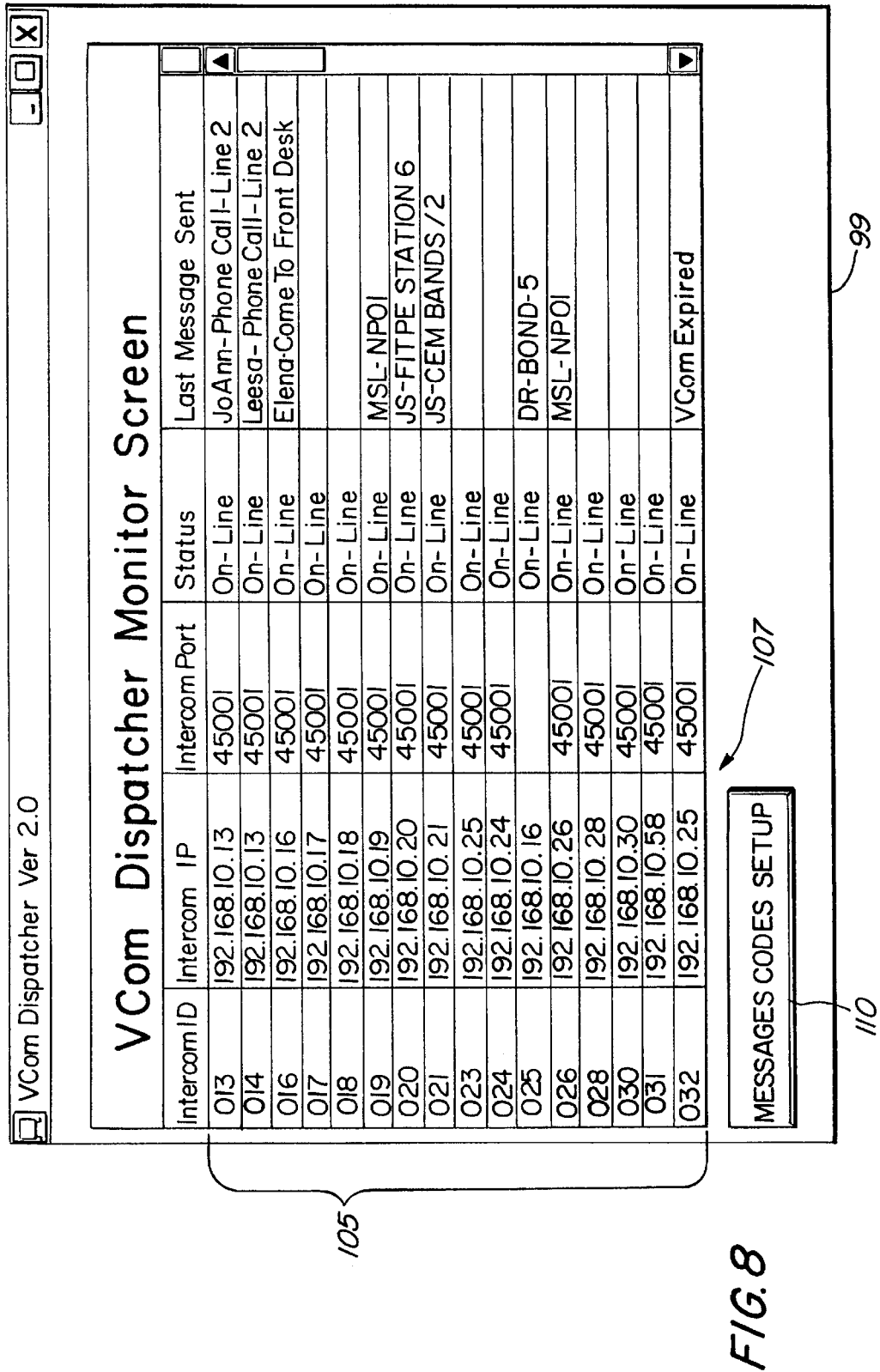
FIG. 8 is a plane view of the dispatcher screen.

FIG. 8 shows the dispatcher screen 99 that will only be displayed on the monitor 23 of the computer 21 on which the dispatcher has been installed. In the preferred embodiment, the dispatcher is to be installed only on one computer 21 of the network. Otherwise, the intercom system will not function properly. The user of the computer 21 having the dispatcher can view information for all of the stations 24 on the dispatcher screen 99. Among other information, dispatcher screen 99 has a list of stations 105 represented by respective station identification numbers and a list of corresponding computer IPs 107.

In another embodiment, the dispatcher is installed on each of the member computers 21 of the network. In this embodiment, the software permits the intercom module 29 and banner 30 to function properly even though the dispatcher module 27 is installed on each computer 21. In this embodiment, only one of the dispatcher modules is permitted to be active. This is achieved by software control. For example, the first computer 21 that is turned on may be the computer having the active dispatcher 27. Alternatively, the dispatcher of the most recent computer 21 communicated with the network 20 can be automatically activated and the dispatcher that was previously operating can be automatically shut down by software control. In this way, the dispatcher 27 in this embodiment is a roving dispatcher. It can be appreciated that the software 25 must comprise a means for transferring information to the newly activated dispatcher. Any of a variety of arrangements is acceptable as long as the system software activates one dispatcher 27 when another is turned off. That is, turning off the computer 21 or closing the intercom module itself on a given computer 21 having the currently active dispatcher 27 has the effect of providing for activation of another one of the dispatchers 27 through software control as long as at least one computer is on. In this embodiment the dispatcher 27 and the intercom 29 may be integrated as a single module.

The roving dispatcher 27 embodiment is especially advantageous for networks in which at least one of the computers 21 is configured to automatically shut down after a predetermined time idle. The roving dispatcher embodiment prevents the intercom from being shut down while at least one computer 21 of the network 20 is on. It is contemplated that the roving dispatcher embodiment would be advantageous, for example, in a home network in which a computer may be configured to shut down automatically, or in which younger members of the family might accidentally or purposely shut down one of the computers 21 or the intercom modules 27, 29 on the computer 21. With the roving dispatcher, the rest of the computers 21 and the intercom system 15 are not affected when the active dispatcher is disabled. In either embodiment a user may adjust the settings for the dispatcher by clicking on the setup soft button 110 at the lower right corner of dispatcher screen 99.

Figure 9:
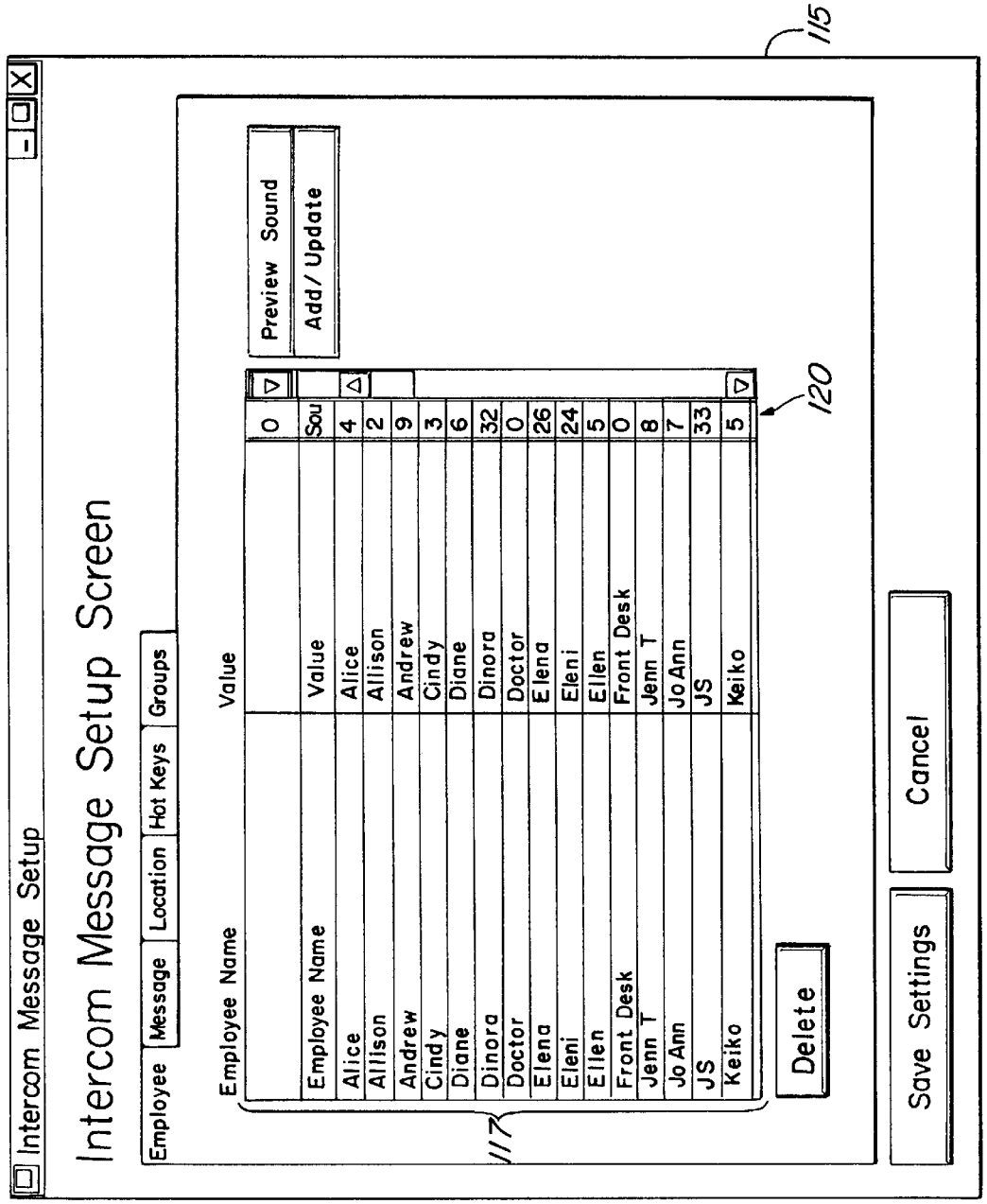
FIG. 9 is a plane view of the message setup screen in a first configuration.
Figure 10:
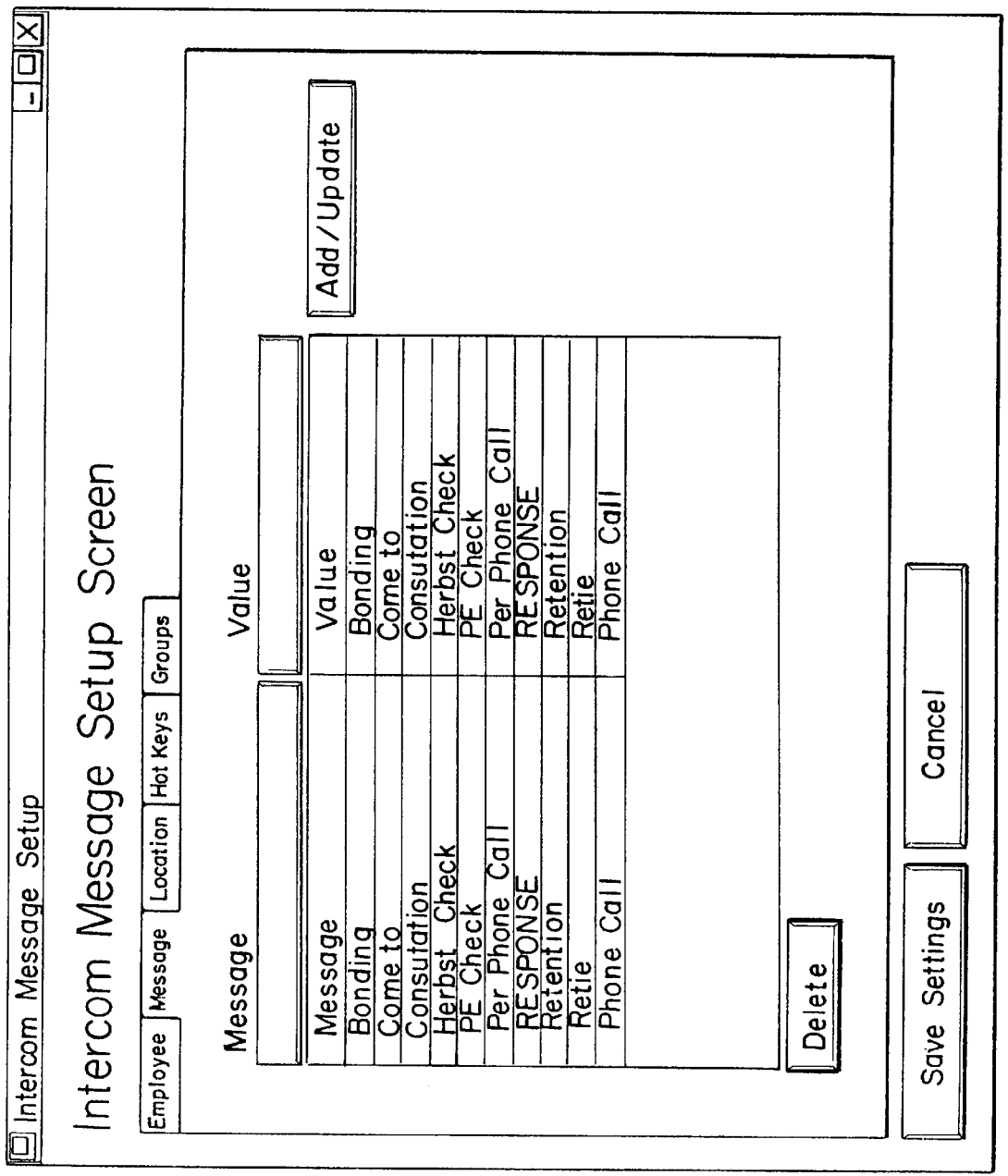
FIG. 10 is a plane view of the message setup screen in a second configuration.
Figure 11:
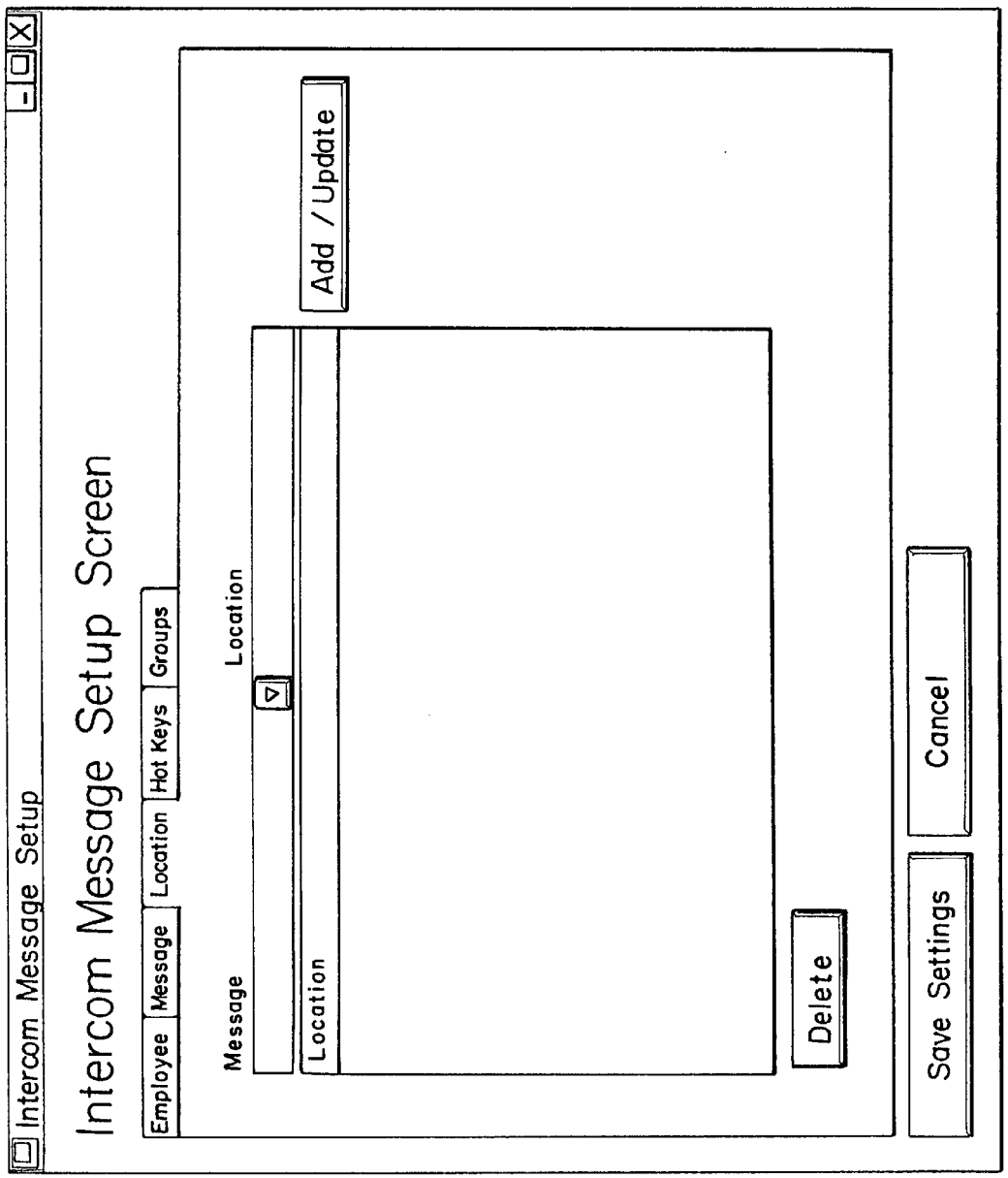
FIG. 11 is a plane view of the message setup screen in a third configuration.
Figure 12:
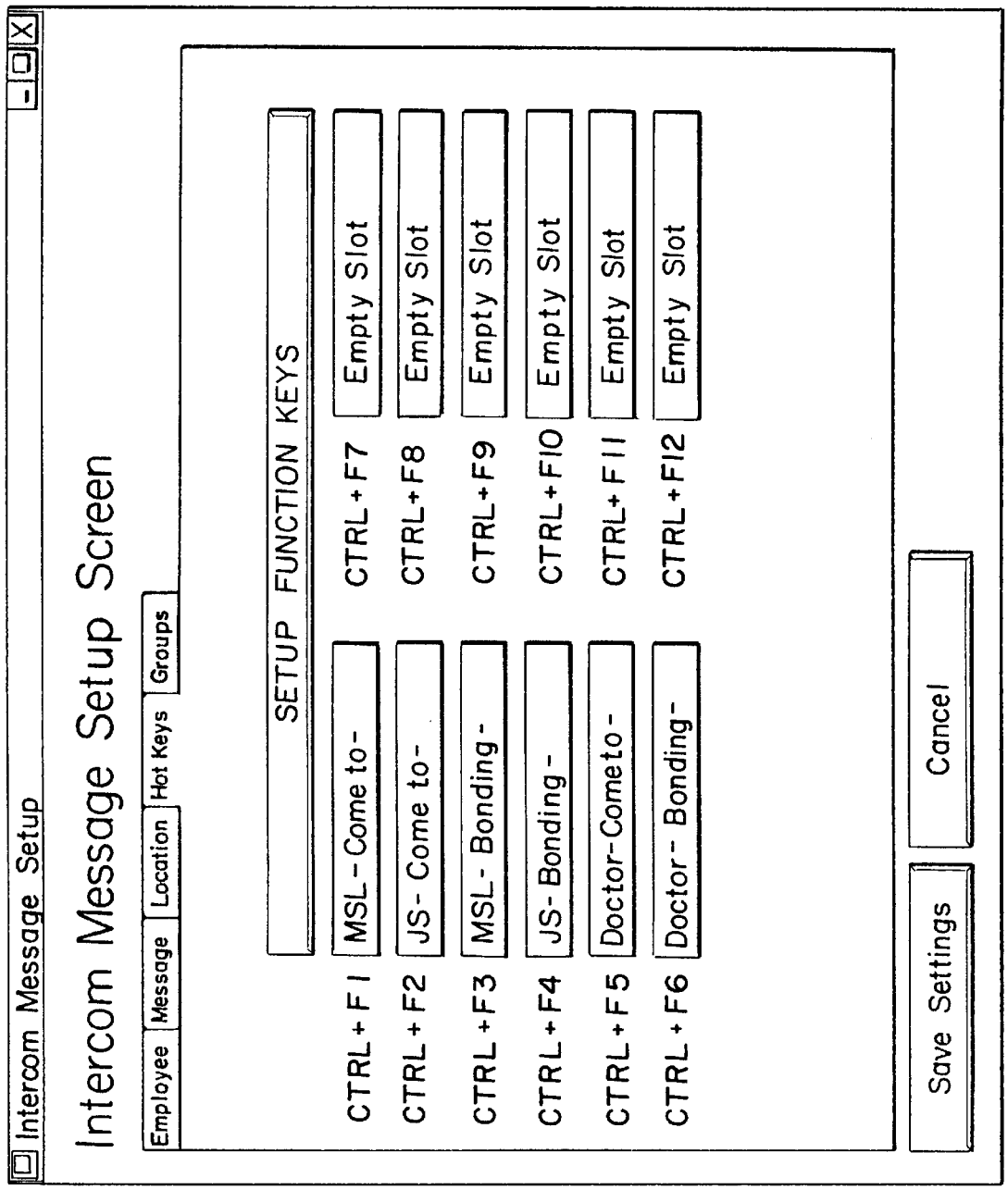
FIG. 12 is a plane view of the message setup screen in a fourth configuration.
Figure 13:
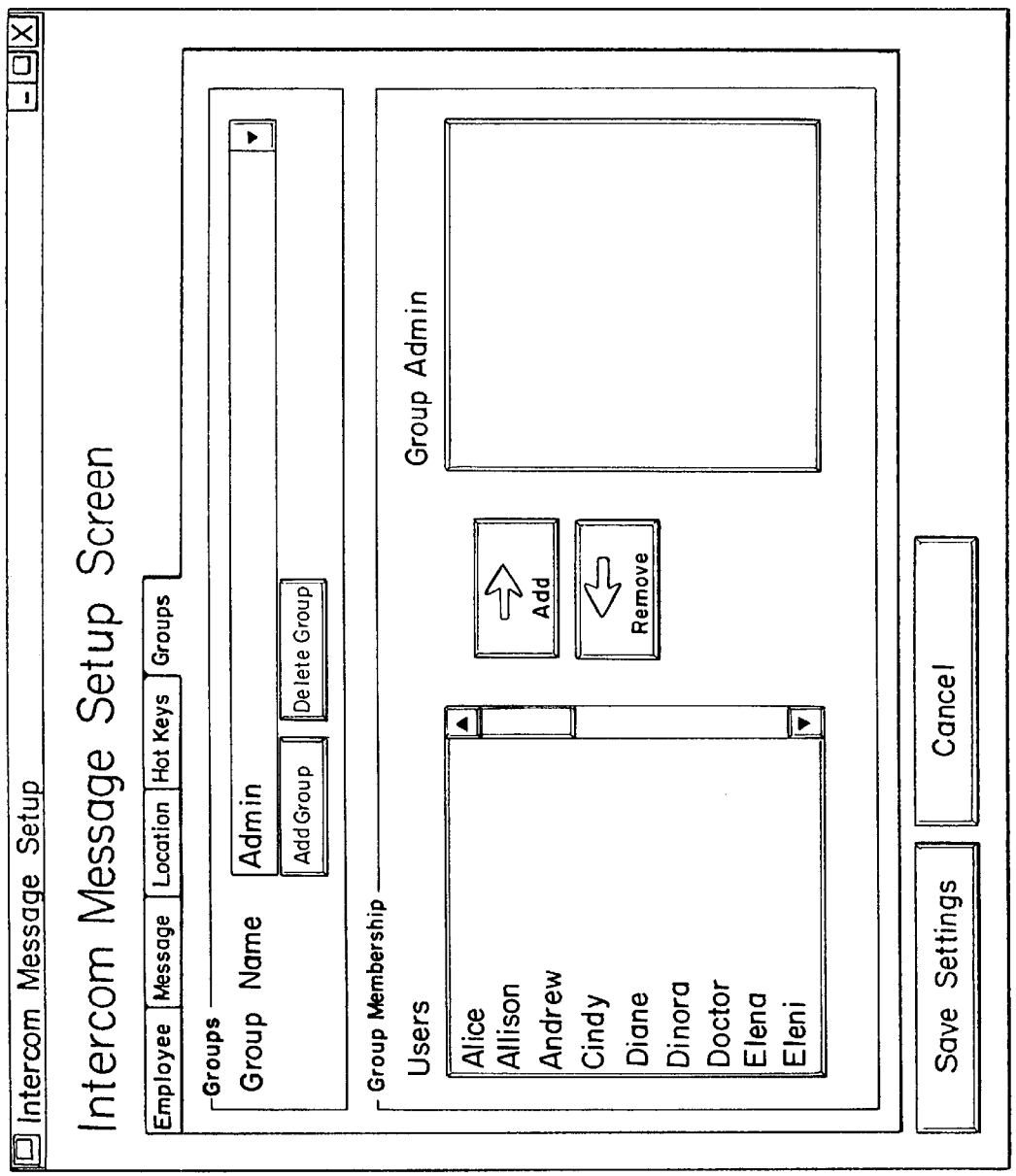
FIG. 13 is a plane view of the message setup screen in a fifth configuration.

As shown in FIG. 9, clicking on the setup soft button 110 brings up setup screen 115. FIG. 9 is a first configuration of the setup screen 115 in which addressees' information may be added, deleted or modified. As such, an editable list of addressees 117 corresponds to the list of addressees 40 displayed on intercom panel 35 and includes the addressees by name. Column 120 has numbers representing unique sounds or tones assigned to the addressees. FIGS. 10–13 show second through fifth configurations of the setup screen respectively that have editable lists or pre-programmable functions similar to those of the first configuration of FIG. 9. The configuration of FIG. 10 provides for preprogramming or editing preset messages 45. FIG. 11 provides for pre-programming or editing the list of locations 50. FIG. 12 provides for pre-programming of function keys 60. FIG. 13 provides for setting up groups.

Having described the various elements shown in the Figures, it is to be explicitly understood, that many variations of the details of the above described system may be modified without departing from the spirit and scope of the invention. It is to be further explicitly understood that the displays with all of their parts including icons, soft buttons, fields for inserting or editing text are implemented under the network-based intercom system program control with limited input by a user as has been described above. As such, the instant invention advantageously eliminates the need for hard-wired, wireless, or otherwise conventional intercom systems.

The instant invention is a new and useful network-based intercom system made up of a combination of apparatuses with network-based intercom software. As such, the invention is also a new and useful method for an interoffice communication enabled by the network-based intercom system software 25 comprising a computer program. The invention is also a method to simulate a hardware based, dedicated intercom system with instant messaging.

The invention is thus a computer program system and method enabling communication between individuals or groups and allowing non-voice transmission of detailed information and responses over a local area network (LAN). It is also contemplated that the invention encompasses the above described concepts in combination with voice transmissions of detailed messages, which may be translated into text or which may be utilized to select a preset message by voice or command recognition technology. It is also contemplated that the instant invention may be implemented over the Internet. In this case, it is contemplated that the system can be made to have the dispatcher on a web site, allowing the intercom to function between multiple distant locations.

As described above, the basic components of the network-based intercom software system 15 include a software dispatcher 27 and software intercom module 29 for respective stations 24. Alternatively, the system may be resident on a remote server accessed by, for example, "Terminal Server" or "Citrix". The software intercom module is configured for operating on PC computers 21 linked by a LAN or over the Internet. The PC computers 21 are not dedicated to the network-based intercom of the instant invention. Furthermore, the software 25 program resides independently from and does not interfere with any other applications running on the individual PCs. The dispatcher can reside in any of the computers 21 on the LAN. A module is loaded into each member computer 16 in the LAN.

Figure 14:
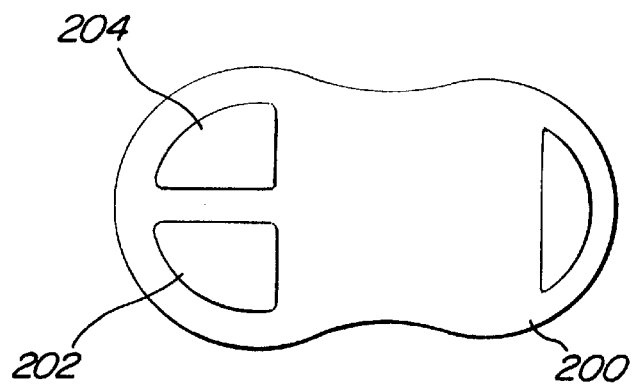
FIG. 14 is a plane view of a portable remote control device.
Figure 15:
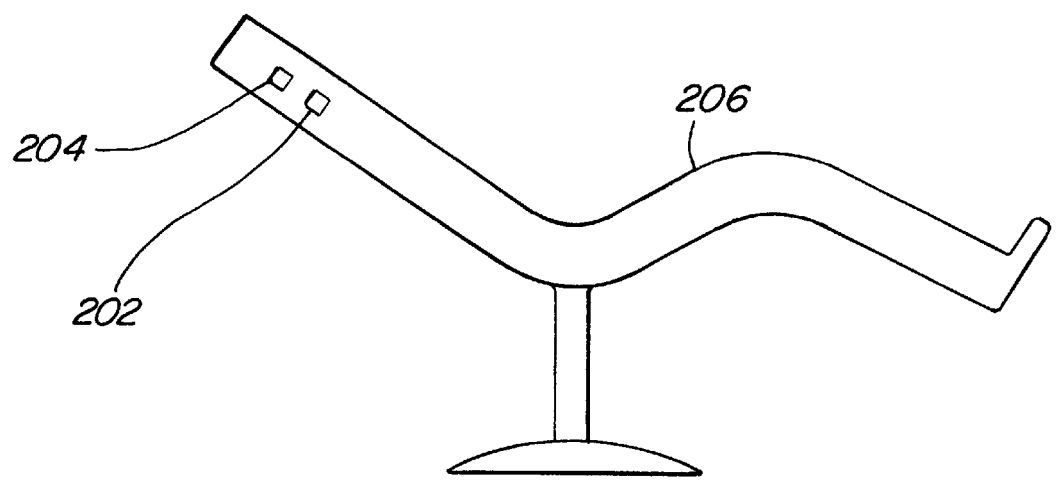
FIG. 15 is a side view of a chair having a remote control thereon.

The voice activated system could be activated by an assistant at a patient's chair, for example. The message can be initiated from anywhere that a microphone at the station 24 can be actuated. Alternatively, a remote control device 200 is employed in combination with the system. As shown in FIG. 14, the remote control device 200 has a pair of buttons 202, 204. One of the buttons 202 can be used to create a complete message so that a user need not go to a station 24. For example, an assistant can press button 202 to call the doctor generally or to call the doctor to a particular chair 206 as shown in FIG. 15. As such, the remote control device 200 of the instant invention can either be carried by the user or installed at a site by being added to or integrally included with a chair structure or a cabinet.

Any of a variety of protocols for integrating radio frequency signals into the system 15 may be incorporated. For example, Blue Tooth, Wi-Fi, or other PDA type protocols may be used to implement the remote device in the system 15. Examples of these protocols are pocket 800.11A or 800.11B. The system can be set up with a receiver or transceiver for receiving a signal from such a remote device and for generating a message similar to a hot key message in accordance with software control. The first button 202 may be pressed a second time to cancel a message. Alternatively, the second button 204 can be pressed to cancel the message so that the user need not go to the keyboard to create and delete the message.

The method includes sending messages by means of bringing up network-based intercom panel screen 35, clicking on individual addressees, selectively followed by a preset message, a room location or additional message. Upon selection of the predetermined components of the basic message, the message is automatically sent. The message usually has three components. However, the number of components can be modified to meet the needs of a particular office or organization. Alternate methods for initiating messages include, but are not limited to, using the function keys for certain pre-entered messages, using the function key followed by written text of any length entered by a keyboard, clicking on a send soft button 63 on the intercom panel 35 after one or more components have been selected, or any combination of these steps.

In the preferred embodiment, the messages appear on the screens of the member computers 21 immediately and automatically and are accompanied by an audible tone unique to the addressee. The messages appear on a banner that can be modified as to size, placement, color and method of display. The method of display includes options of line by line, page at a time, and scrolling with no delay between the last message in the scroll and beginning the first again. A symbol or some other marker is displayed proximate to either the oldest message or the newest message in the cue.

In an alternative embodiment, a message may be sent after a certain time delay. This time delay will typically correspond to the difference in times at the sending and receiving stations 24. The system can be configured to calculate the delay based on the difference in time zones between the sending and receiving stations 24 based on location information in the system 15. Alternatively, the user can selectively input a specific time delay. The time delay features are particularly useful in cases in which the stations are geographically remote from each other. That is a sender may be located on the other side of the world from the recipient. The sender may want the message to reach the recipient at a specific time of the recipient's work day, for example. In either embodiment, the messages are made up of names, number codes, text, color-coded boxes, or any combination of these, and are listed in a prioritized order. Typically the order is in the order in which the messages were entered.

Prioritization allows the messages to be responded to by the addressee in the correct sequence. The banner can be set to stay on a monitor screen 23 continuously or for selectable periods of time prior to being returned to the background. Messages can be deleted by: clicking on the message to be deleted, clicking and getting a list of all messages displayed to allow specific messages to be deleted, or pressing a function key on the PC keyboard. The function key for deleting may be the same key that initiated the message.

Additional aspects of the instant invention are user selectable. The individual member PC 21 can be set to receive display messages from only specific groups or individual members within the membership. This feature helps to relieve clutter on the message banner, while allowing another individual, such as a user at a station having the dispatcher, to monitor all message traffic. It also allows specific groups within the membership to communicate within the group without the message appearing on the entire network.

Another feature allows messages to be repinged, by resending the audible tone assigned to the addressee without adding the message to the cue a second time. Other program systems allow the user to have the intercom banner appear on top of any running program screens or to only sound but not cover any running screens. In the latter case of only sounding, the banner can then be brought up by means of a function key or by clicking on an icon of the banner in the tool bar. Once the message(s) have been viewed, the banner may be returned to the background or tool bar. In this way, the system may be set by user selection to not take the focus away from any other running program so as to not interfere with data entry in progress for those other programs.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A network-based intercom system for use in a network with a plurality of stations communicated with the network, wherein each station comprises:

intercom means for simulating an intercom panel which is selectively displayed to communicate messages among the stations communicated through the network;

banner means for displaying all of the received messages; and notification means for selectively generating an audible signal which is unique to an intended recipient of a message received by the intercom system, which audible signal can be generated by each of the plurality of stations communicated with the network, the notification means for selectively notifying the intended recipient when a message for the intended recipient is received by the stations from another one of the plurality of stations communicated with the network, said banner means further comprising a means for displaying banner options made available to the user by software control, said banner options comprising:
    banner size;
    banner positioning on a monitor screen;
    banner color; and
    message display format in the banner, selectable from among: line-by-line, page-at-a-time, or continuous scrolling of a list of messages to be displayed.

2. The intercom system of claim 1, said banner means comprising means for displaying a plurality of messages in chronological order so that said messages may easily be answered in the order said messages were received.

3. The intercom system of claim 1, said banner means comprising means for displaying a plurality of messages in order of priority with respect to a predetermined order of priority.

4. The intercom system of claim 1, said banner means further comprising means for displaying additional banner options including options permitting the user by software control to selectively set the banner to have either of a continuous display on the user's screen or a time limited display, wherein said time may be selected and after which, said banner is moved into a background.

5. The intercom system of claim 1, said banner means further comprising a means for distinguishing a first message in said display format of said list of messages.

6. The intercom system of claim 1, said banner means further comprising a means for selectively, automatically including at least one of a sender and a location associated with each message received on said banner.

7. A network-based intercom system for use in a network with a plurality of stations communicated with the network, wherein each station comprises:

intercom means for simulating an intercom panel which is selectively displayed to communicate messages among the stations communicated through the network;

banner means for displaying all of the received messages; and notification means for selectively generating an audible signal which is unique to an intended recipient of the message using the intercom system, which audible signal can be generated by each of the plurality of stations communicated with the network, the notification means for selectively notifying the intended recipient when a message for the intended recipient is received by the stations from another one of the plurality of stations communicated with the network, said intercom means further comprising means for user selection of individuals or groups from among the users, wherein said user selection is for:
    limiting from whom the messages at said station may be received, and
    limiting to whom a message may be sent.

8. A network-based intercom system for use in a network with a plurality of stations communicated with the network, wherein each station comprises:

intercom means for simulating an intercom panel which is selectively displayed to communicate messages among the stations communicated through the network;

banner means for displaying all of the received messages; and notification means for selectively generating an audible signal which is unique to an intended recipient using of the intercom system, which audible signal is generated by at least one of the plurality of stations communicated with the network, the notification means for selectively notifying the intended recipient when a message for the intended recipient is received by the stations from another one of the plurality of stations communicated with the network, said intercom means further comprising a means for displaying options for user selection, said options comprising:
    a list of individual addressees;
    a list of preset messages,
    a list of station locations; and
    a means for selectively storing by software control non-urgent messages for later printing or retrieval.

9. The intercom system of claim 8, further comprising said means for storing in addition to a means for standard transmission of said messages to provide a dual messaging feature in which said means of storing provides a permanent record of a sent message that can be retrieved and printed in addition to said sent message displayed on a recipient's banner.

10. A network-based intercom system for use in a network with a plurality of stations communicated with the network, wherein each station comprises:

intercom means for simulating an intercom panel which is selectively displayed to communicate messages among the stations communicated through the network;

banner means for displaying all of the received message; and notification means for selectively generating an audible signal which is unique to an intended recipient using of the intercom system, which audible signal can be generated by each of the plurality of stations communicated with the network, the notification means for selectively notifying the intended recipient when a message for the intended recipient is received by the stations from another one of the plurality of stations communicated with the network said intercom means further comprising a means for displaying options for user selection, said options comprising:
a list of individual addressees;
a list of preset messages;
a list of station locations; and a means for message transmission by voice activation, wherein said system includes voice or command recognition software control that completes selection of at least one of said user selectable options for a message to be sent.

11. The intercom system of claim 10, said means for message transmission further comprising means for voice activation of all of the user selectable options.

12. A network-based intercom system for use in a network with a plurality of stations communicated with the network, wherein each station comprises:

intercom means for simulating an intercom panel which is selectively displayed to communicate messages among the stations communicated through the network;

banner means for displaying all of the received messages; and notification means for selectively generating an audible signal which is unique to an intended recipient using the intercom system, which audible signal can be generated by each of the plurality of stations communicated to the network, the notification means for selectively notifying the intended recipient when a message for the intended recipient is received by the stations from another one of the plurality of stations communicated with the network wherein the system is implemented on a network of individual computers connected to each other, and comprising a software selected dispatcher activated at all times in one of the computers of the network, said software controlled dispatcher comprising means for controlling: message routing, assignment of unique tones to respective recipients, designation of station numbers, assignment of message codes, and automatic prioritization of messages for display according to actions to be undertaken by the recipient in response to the messages.

13. A network-based intercom system for use in a network with a plurality of stations communicated with the network, wherein each station comprises:

intercom means for simulating an intercom panel which is selectively displayed to communicate messages among the stations communicated through the network;

banner means for displaying all of the received messages in a banner; and notification means for selectively generating an audible signal which is unique to an intended recipient of the intercom system, which audible signal can be generated by each of the plurality of stations communicated with the network, the notification means for selectively notifying the intended recipient when a message for the intended recipient is received by stations from another one of the plurality of stations communicated with the network said intercom means further comprising: a means for displaying options for user selection, said options comprising:
a list of individual addressees;
a list of preset messages;
a list of station locations and a message handling means comprising at least one of:

a means for initiating a message send, said means for initiating said message send comprising at least one of:
bringing up said simulated intercom panel on a computer screen of at least one of said stations of said network,
clicking on at least one individual addressee in a list of addressees, or
pressing a function key; and a means for automatic message receipt that receipt that requires no intervention by an addressee, wherein a sent message is automatically received and automatically appears on the banner of said addressee.

14. A network-based intercom system for use in a network with a plurality of stations communicated with the network, wherein each station comprises:

intercom means for simulating an intercom panel which is selectively displayed to communicate messages among the stations communicated through the network;

banner means for displaying all of the received messages; and notification means for selectively generating an audible signal which is unique to an intended recipient of the intercom system, which audible signal can be generated by each of the plurality of stations communicated with the network, the notification means for selectively notifying the intended recipient when a message for the intended recipient is received by the stations from another one of the plurality of stations communicated with the network wherein at least one of the stations is geographically remote from the other ones of the plurality of stations so that a geographically distributed intercom system is provided, said intercom system comprising means for selectively sending a message after a predetermined time delay based on the geographic location of the recipient.

15. A network-based intercom system for use with a plurality of stations communicated with the network, wherein each station comprises:

intercom means for simulating an intercom panel which is selectively displayed to communicate messages among the stations communicated through the network;

banner means for displaying all of the received messages; and notification means for selectively generating an audible signal which is unique to an intended recipient of the intercom system, which audible signal can be generated by each of the plurality of stations communicated with the network, the notification means for selectively notifying the intended recipient when a message for the intended recipient is received by the stations from another one of the plurality of stations communicated with the network wherein said intercom system is adapted to be implemented on computers of respective stations of said network, said network based intercom system further comprising:
  a software selected dispatcher for each of a plurality of said computers, each said software selected dispatcher comprising means for controlling: message routing, assignment of unique tones to respective intended recipients, designation of station numbers, assignment of message codes, and automatic prioritization of messages for display according to actions to be undertaken by the recipient in response to the messages, and
  means for activating one of said plurality of computers to perform as said dispatchers when another one of said computers acting as the dispatcher is closed so that one of the computers is activated as the selected dispatcher at all times.

16. A method for providing efficient, non-interruptive, distance communication by way of a network-based intercom system, said system integrated on a plurality of non-dedicated computers providing respective stations of a network, said system comprising software, said software comprising a dispatcher module in anyone of said computers, said software further comprising an intercom module in each of said computers, the method comprising the steps of:
  selectively placing a network-based intercom panel display and a message banner on a screen of each of said stations facilitated by said software control;
  maintaining a dispatcher list of all current stations in said network in said one of said computers;
  coordinating all current messages by computer readable instructions in said software in said dispatcher by:
    designating at least one station number to which each of said messages is sent,
    assigning at least one audible tone per message, said tone being unique to an addressee to whom said message is being sent, and
    routing all of said messages automatically when a final one of a predetermined number of options has been selected;
  selectively, automatically sounding said at least one audible tone at a respective one of said computers when one of said messages is sent to said one of said computers; and
  wherein said messages are automatically received on respective ones of said banners without addressee input, such that each of said messages is received in a non-interruptive manner and a notification of the arrival of a message is also received in the form of said audible tone, so that an addressee may selectively view the screen without stopping other activities.

17. The method of claim 16, the step of coordinating is based on sender and recipient input at respective ones of said stations and further comprising:
  assigning message codes and preset messages;
  filtering sent messages; and
  displaying messages in an order of priority.

18. The method of claim 17, further comprising initiating a message send by a vocal input, wherein said system utilizes voice or command recognition integrated with said software.

19. The method of providing efficient, noninterruptive, distance communication of claim 16, the step of routing further comprising automatically routing at least one message in response to actuation by a sender of a remote control device.

20. A method of using a network-based intercom system for efficient, non-interruptive, distance communication, said system being configured for implementation on a network comprising a plurality of computers providing respective stations of said network, said system comprising software including a dispatcher module for anyone of said computers, said software further including an intercom module in each of said computers, the method of using comprising the steps of:
  selectively displaying a message banner on a monitor of one of said computers, said message banner comprising a complete message;
  initiating a message send by:
    bringing up a simulated intercom panel via user interface means,
    selecting components of a message from lists on said intercom panel;
  completing a message send via user interface means.

21. The method of using of claim 20, the step of bringing up further comprising clicking on a soft key on said banner.

22. The method of using of claim 20, the step of selecting components further comprising selecting an addressee from one of said lists.

23. The method of claim 22, the step of completing a message send further comprising automatically completing a message send by selecting each of a predetermined number of components of said message.

24. The method of claim 20, further comprising automatically receiving a message when another user completes a message send.

25. The method of claim 20, further comprising:
  setting up the dispatcher by assigning values to respective items on a list corresponding to at least one of said lists on said intercom panel;
  displaying a plurality of messages on said banner in an order of priority based on said values.

26. The method of claim 20, the step of selectively displaying said banner further comprising:
  selecting a length of time for displaying said banner; and
  automatically moving said banner into a background after said length of time has lapsed by software control.

27. The method of claim 20, further comprising:
  setting up the dispatcher by inputting predetermined addressees into a list of preset addressees to be selected during message formulation;
  setting up the dispatcher by inputting predetermined messages into a list of preset messages to be selected during message formulation; and
  setting up the dispatcher by inputting predetermined locations into a list of preset locations to be selected during message formulation.

28. The method of claim 27, further comprising setting up the dispatcher by inputting respective unique audible tones corresponding to said predetermined addressees.

29. The method of claim 28, the step of initiating further comprising selecting at least one addressee and at least one of a preset message and a preset location.

30. A network based computer intercom user interface implemented on a plurality of stations of a network comprising:
  a software-based simulated intercom panel and means for selectively displaying said simulated intercom panel on the screen of each of said plurality of stations;
  a software-based banner display and means for displaying all of the received messages at each of said plurality of stations on said banner display; and a software controlled, audible signal and means for generating said audible signal wherein said audible signal is unique to an intended recipient of a message, and wherein said audible signal can be generated by each of the plurality of stations for selectively notifying the intended recipient when a message for the intended recipient is received by each station.

31. The user interface of claim 30, said means for displaying said simulated intercom panel further comprising: a means for displaying options for user selection, said options comprising:
   a list of individual addressees,
   a list of preset responses to the content of messages sent to the recipient, and
   a list of station locations.

32. The user interface of claim 31, said means for displaying said simulated intercom panel further comprising a means for permitting the user to selectively transmit a customized response to the content of a message by software control and where the message intended for a recipient is displayed on all stations on the network enabled to receive messages for the recipient.

33. The user interface of claim 31 comprising function keys designated by software control to correspond to certain said preset responses to the content of messages and where the message intended for a recipient is displayed on all stations on the network enabled to receive messages for the recipient.

34. The user interface of claim 31, means for selectively displaying said simulated intercom panel further comprising, by software control, a means for selectively storing non-urgent messages for later printing or retrieving.

35. The user interface of claim 34, further comprising said means for storing in addition to a means for standard transmission of said messages to provide a dual messaging feature in which said means for storing provides a permanent record of a sent message that can be retrieved and printed in addition to said sent message displayed on a recipient's banner.

36. The user interface of claim 31, said means for displaying said simulated intercom panel further comprising a means for message transmission by voice activation, wherein said system includes voice or command recognition software control that completes selection of at least one of said user selectable options for a message to be sent.

37. The user interface of claim 36, said means for message transmission further comprising means for voice activation of all of the user selectable options.

38. The user interface of claim 31, comprising:
   a means for initiating a message send, said means for initiating said message send comprising at least one of:
   bringing up said simulated intercom panel on a computer screen of at least one of said stations of said network,
   clicking on at least one individual addressee in a list of addressees, or
   pressing a function key; and a means for automatic message receipt that requires no intervention by an addressee, wherein a sent message is automatically received and automatically appears on a banner of said addressee.

39. The user interface of claim 38, said means for initiating further comprising a hot key for pressing by a sender representing a pre-selected message to automatically include an implied location of said sender in the message.

40. The user interface of claim 38, said means for initiating further comprising a hot key for pressing by a sender representing a pre-selected message to automatically create a partial message, said means for initiating further comprising a means for pulling up a dialog box for customized entry of a remainder of said partial message to create and send a complete message.

41. The user interface of claim 30, said means for selectively displaying messages further comprising a means for displaying banner options made available to the user by software control, said banner options comprising:
   banner size;
   banner positioning on a monitor screen;
   banner color; and
   message display format in said banner, selectable from among: line-by-line, page-at-a-time, or continuous scrolling of a list of messages to be displayed.

42. The user interface of claim 41, said means for selectively displaying messages comprising means for displaying a plurality of messages on said banner in chronological order so that said messages may easily be answered in the order said messages were received.

43. The user interface of claim 41, said banner means comprising a means for selective message deletion, by one of:
   clicking on the message,
   displaying a list of all the messages for selective message deletion from among said list,
   pressing a specific function key for deleting a specific message.

44. The user interface of claim 41, said means for selectively displaying messages further comprising means for automatic deletion of a message in said banner after a predetermined length of time from when the message was received and answered.

45. The user interface of claim 41, said means for selectively displaying messages further comprising a means for distinguishing said display format of a first message in paid display format of said list of messages.

46. The user interface of claim 41, said means for displaying messages further comprising a means for selectively, automatically including at least one of a sender and a location associated with each message received on said banner.

47. The user interface of claim 30, said means for generating an audible notification further comprising a means for additional actuation of said means for audible notification at a predetermined interval after an initial actuation when said message is not answered.

48. The user interface of claim 30, said plurality of stations of said network comprising respective individual computers connected to each other, and comprising a software controlled dispatcher in anyone of the computers, said software controlled dispatcher comprising means for controlling: message routing, assignment of unique tones to respective recipients, designation of station numbers, assignment of message codes, and prioritization of messages for display.

49. The user interface of claim 30 wherein at least one of the stations is geographically remote from other ones of the plurality of stations so that a geographically distributed intercom system is provided, said intercom system comprising means for selectively sending a message with a time delay based on the geographic location of the recipient.

50. The user interface of claim 30, said user interface adapted to be implemented on computers of respective stations of said network and adapted to form a network based intercom system, said network based intercom system comprising:

a software controlled dispatcher adapted to be implemented in each of a plurality of said computers, said software controlled dispatcher comprising means for controlling: message routing, assignment of unique tones to respective users, designation of station numbers, assignment of message codes and prioritization of messages for display, and means for activating one of said plurality of said dispatchers when another one of said dispatcher is closed means for automatically activating said one of said dispatchers when said another said dispatcher is closed, wherein said another one of said dispatchers is closed by the computer in which it resides being shut down.

51. The user interface of claim 30 further comprising a remote control device including at least one button and means for sending a complete message on said system by pressing said at least one button.

52. A network-based intercom system for efficient, non-interruptive, distance communication, said system being configured for implementation on a network comprising a plurality of computers providing respective stations of said network, said system comprising:

software including a dispatcher module for anyone of said computers and an intercom module in each of said computers;

a user interface comprising:
a selectively displayed message banner on a monitor of one of said computers;
a selectively displayed simulated intercom panel on said monitor, wherein the simulated intercom panel comprises lists of selectable preset components for formulating messages; and
a means for selectively sending a formulated message.

53. A method for providing efficient, non-interruptive, distance communication by way of a network-based intercom system, said system integrated on a plurality of non-dedicated computers providing respective stations of a network, said system comprising software, said software comprising a dispatcher module in any one of said computers, said software further comprising an intercom module in each of said computers, the method comprising the steps of:

selectively placing a network-based intercom panel display and a message banner on a screen of each of said stations facilitated by said software control;

maintaining a dispatcher list of all current stations in said network in said one of said computers;

coordinating all current messages by computer readable instructions in said software in said dispatcher by:
designating at least one station number to which each of said messages is sent, and
assigning at least one audible tone per message;

selectively, automatically sounding said at least one audible tone at a respective one of said computers when one of said messages is sent to said one of said computers; and wherein said messages are automatically received on respective ones of said banners without addressee input, such that each of said messages is received in a non-interruptive manner and a notification of the arrival of a message is also received in the form of said audible tone, so that an addressee may selectively view the screen without stopping other activities.

54. A network based computer intercom user interface implemented on a plurality of stations of a network, comprising:

a software-based simulated intercom panel and means for selectively displaying said simulated intercom panel on the screen of each of said plurality of stations;

a software-based banner display and means for selectively displaying complete messages received at each of said plurality of stations on said banner display;

a software controlled, audible signal and means for generating said audible signal; and wherein said audible signal is generated by at least one of the plurality of stations for selectively notifying a user when a message for the user is received by the at least one station.

* * * * *